United States Patent [19]

Fukuta

[11] Patent Number: 5,773,803
[45] Date of Patent: Jun. 30, 1998

[54] CODE DISCRIMINATING SYSTEM FOR DETERMINING CORRESPONDENCE OF CODES IN A SHORT TIME

[75] Inventor: Yoshihiro Fukuta, Toyota, Japan

[73] Assignee: Toyota Jidosha Kabushiki Kaisha, Toyota, Japan

[21] Appl. No.: 722,320

[22] Filed: Sep. 27, 1996

[30] Foreign Application Priority Data

Sep. 28, 1995 [JP] Japan .................................. 7-251075

[51] Int. Cl.[6] .................................................. G06F 17/00
[52] U.S. Cl. ........................ 235/375; 235/382; 235/382.5
[58] Field of Search ................................ 235/382.5, 375, 235/382

[56] References Cited

U.S. PATENT DOCUMENTS

| | | | |
|---|---|---|---|
| 4,439,670 | 3/1984 | Basset et al. | 235/382.5 |
| 4,811,012 | 3/1989 | Rollins | 235/382.5 |
| 4,882,474 | 11/1989 | Anderl et al. | 225/382.5 |
| 5,321,242 | 6/1994 | Heath, Jr. | 235/382.5 |
| 5,477,041 | 12/1995 | Miron | 235/382.5 |
| 5,506,575 | 4/1996 | Ormos | 235/382.5 |
| 5,515,036 | 5/1996 | Waraksa | 235/382 X |

FOREIGN PATENT DOCUMENTS

| | | |
|---|---|---|
| 62-251962 | 11/1987 | Japan . |
| 63-024066 | 2/1988 | Japan . |
| 4-015141 | 3/1992 | Japan . |

*Primary Examiner*—Harold Pitts
*Attorney, Agent, or Firm*—Cushman Darby & Cushman IP Group of Pillsbury Madison & Sutro LLP

[57] ABSTRACT

A code discriminating system checks the correspondence between a key code and each of a plurality of registered codes in a short time. The code discriminating system receives the key code from a transponder provided in a key so that the key code is compared with the registered codes. A priority is provided to one of the registered codes so that the key code is compared with the one of the registered codes first. Thus, the registered code having the priority is compared with the key code first. The registered code to be provided with the priority is selected so that the selected registered code corresponds to the key code provided to the most frequently used key. Thus, a time period spent on the determination process is reduced for the most frequently used key.

15 Claims, 7 Drawing Sheets

5,773,803

CODE DISCRIMINATING SYSTEM FOR DETERMINING CORRESPONDENCE OF CODES IN A SHORT TIME

BACKGROUND OF THE INVENTION

1. Field of the Invention

The present invention relates to a code discriminating system used in an anti-theft system for a vehicle and, more particularly, to a code discriminating apparatus which determines whether a key code matches one of a plurality of registered codes.

2. Description of the Related Art

Conventionally, a key system for a vehicle is known in a system disclosed in Japanese Patent Publication No.4-15141. In this system, a registered code is provided to a vehicle and a key code is provided to an ignition key for starting operation of the engine of the vehicle. The prohibition of the operation of the engine of the vehicle is canceled only when it is determined that the key code provided to the ignition key matches the registered code provided to the vehicle. The key system comprises a transponder which is provided in the ignition key to transmit the key code and a memory (ROM) which is provided in the vehicle to store the registered code. A control unit detects the key code transmitted by the ignition key, and determines the correspondence between the detected key code and the registered code stored in the memory. Accordingly, the vehicle cannot be started without the correct key having the correct key code. This prevents theft of a vehicle provided with such a key system.

Generally, more than two keys including a spare key are provided for a single vehicle. When constructing an anti-theft system for a vehicle, different codes may be provided to each of the keys. In such a case, a memory provided in the control unit stores a plurality of registered codes each of which corresponds to a respective one of the different key codes. Additionally, the registered code may be duplicated in the memory in order to prepare for accidental data loss in the memory. Accordingly, in the conventional system in which a plurality of registered codes are provided, it must be determined whether a code corresponding to a transmitted key code is present among the registered codes.

In order to check the correspondence between the key code and each of the registered codes, the registered codes stored in the memory (ROM) must be read and stored in a RAM so that each of the registered codes is compared, in turn, with the transmitted key code. The prohibition of the starting of the vehicle is canceled only when it is determined that there is a registered code which corresponds to the transmitted key code. Thus, if there are many registered codes to be checked in the ROM, it takes a considerable time to read the registered codes in the ROM and store the read registered codes in the RAM. Additionally, it also takes a considerable time to compare the key code with the registered codes. Thus, in the conventional system, there is a problem in that a starting operation of the vehicle cannot be performed immediately after the ignition key is inserted since it takes a long time to check the correspondence between the key code and the registered codes.

SUMMARY OF THE INVENTION

It is a general object of the presence invention to provide an improved and useful code discriminating system in which the above-mentioned problem is eliminated.

A more specific object of the present invention is to provide a code discriminating system which can check the correspondence between a key code and each of a plurality of registered codes in a short time.

In order to achieve the above-mentioned object, there is provided according to the present invention a code discriminating system for determining whether a key code provided to a key matches one of a plurality of registered codes provided to the code discriminating system, the code discriminating system comprising:

communicating means for receiving the key code from the key;

comparing means for comparing the key code with each of the registered codes; and priority providing means for providing a priority to one of the registered codes so that the key code is first compared with the one of the registered codes.

According to the above-mentioned invention, the registered code having the priority is compared with the key code first. If the registered code to be provided with the priority is selected so that the selected registered code corresponds to the key code provided to the most frequently used key, the determination of matching the key code provided to such key can be performed prior to the determination of matching other registered codes. Thus, the time period spent on the determination process is reduced for the most frequently used key.

In one embodiment according to the present invention, the one of the registered codes provided with the priority may be a code of the plurality of the registered codes determined to match the key code in a most recent comparison performed by the comparing means. This is because the most frequently used key has a high probability for consecutive use.

In an alternative case, the one of the registered codes provided with the priority may be a code of the plurality of the registered codes determined by a maximum number of matchings with the key code in previously performed comparisons. A counter may be provided to each of the registered codes so that a number of matchings with the key code is determined by a value of the counter.

In the present invention, the comparing means may comprise a first memory for storing the plurality of the registered codes and a second memory for storing at least one of the registered codes which is read from the first memory, the comparison with the key code being performed on the registered codes stored in the second memory.

The first memory may have a predetermined exclusive address for the one of the registered codes provided with the priority.

Additionally, the one of the registered codes which is stored in the predetermined address of the first memory may be read and stored in the second memory first. The rest of the registered codes stored in the first memory other than the one of the registered codes stored in the first memory may be read and stored in the second memory after it is determined that the one of the registered codes which was read from the predetermined address of the first memory fails to match the key code.

In one embodiment according to the present invention, the first memory may comprise a ROM and the second memory may comprise a RAM. Additionally, the key may include a transponder transmitting the key code in response to a signal provided by the communicating means.

Other objects, features and advantages of the present invention will become apparent from the following detailed description when read in conjunction with the accompanying drawings.

DETAILED DESCRIPTION OF THE PREFERRED EMBODIMENTS

Figure 1:
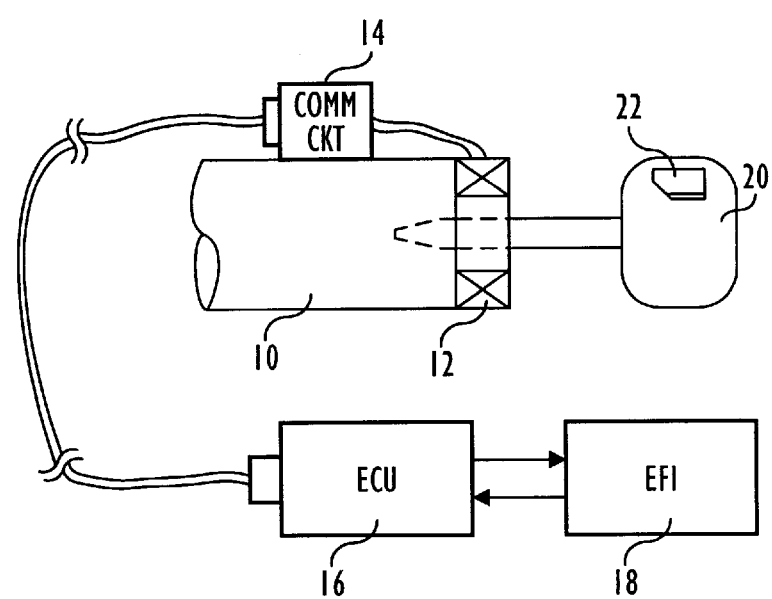
FIG. 1 is a structural diagram of an anti-theft system for a vehicle which is provided with a code discriminating system according to a first embodiment of the present invention.

A description will now be given of a first embodiment of the present invention. FIG. 1 is a structural diagram of an anti-theft system for a vehicle which is provided with a code discriminating system according to the first embodiment of the present invention.

The anti-theft system shown in FIG. 1 comprises a key cylinder 10, an antenna coil 12 provided at an end of the key cylinder 10, a communication circuit 14 connected to the antenna coil 12, an electronic control unit (ECU) 16 connected to the communication circuit 14, an engine controlling computer (EFI computer) 18 connected to the ECU 16 and a transponder 22 incorporated in a key 20. The code discriminating system according to the first embodiment of the present invention comprises the ECU 16 which includes a read only memory (ROM) therein.

Figure 2:
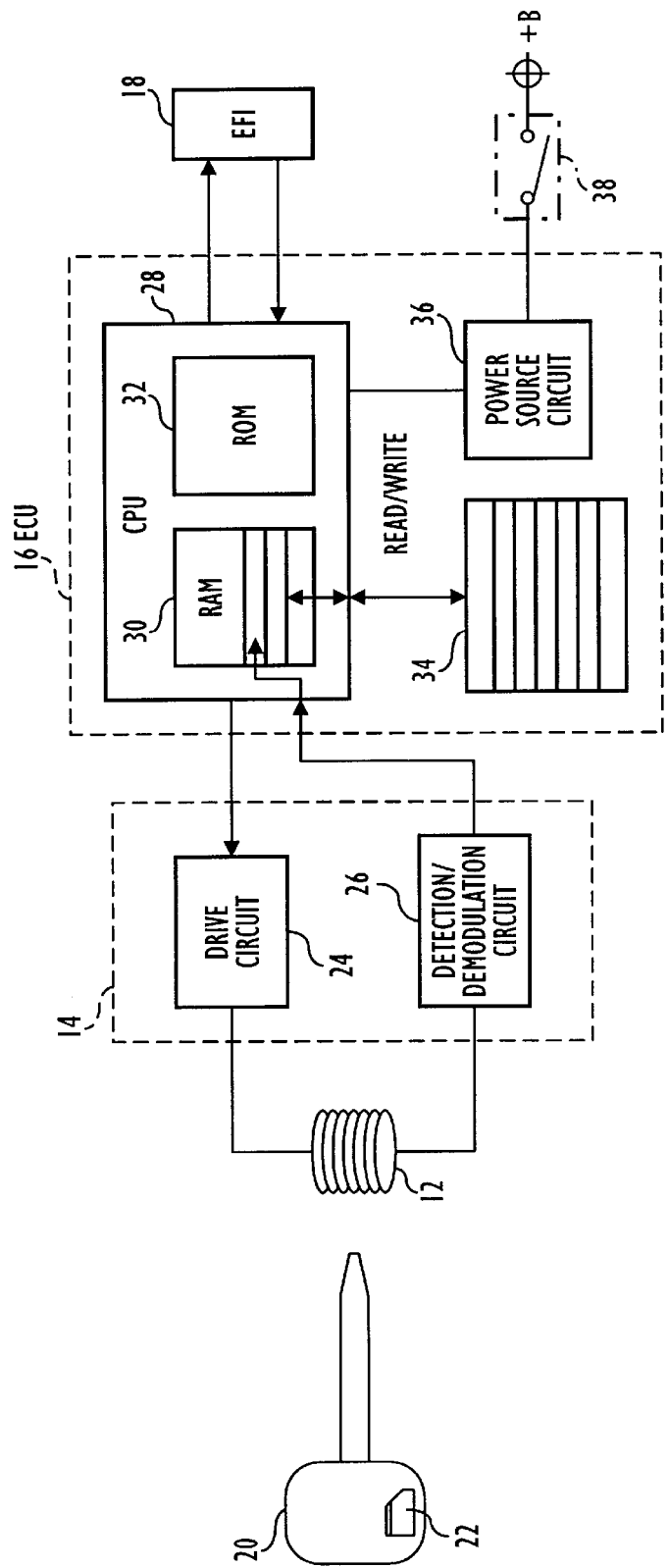
FIG. 2 is a block diagram of the anti-theft system shown in FIG. 1.

FIG. 2 is a block diagram of the anti-theft system shown in FIG. 1. In FIG. 2, the communication circuit 14 and the ECU 16 are described in detail. As shown in FIG. 2, an end of the antenna coil 12 is connected to a drive circuit 24 provided in the communication circuit 14, and the other end of the antenna coil 12 is connected to a detection/demodulation circuit 26 also provided in the communication circuit 14. The drive circuit 24 outputs a voltage signal having a predetermined amplitude. When the voltage signal is output from the drive circuit 24, a voltage across the antenna coil 12 oscillates at a predetermined frequency with a predetermined amplitude.

The detection/demodulation circuit 26 detects an amplitude of the voltage fluctuation at an end of the antenna coil 12, and outputs a signal in response to the detected amplitude. The transponder 22 incorporated in the key 22 transmits a key code to the antenna coil 12 by a serial transmission. When the signal is transmitted from the transponder 22, the amplitude of the voltage fluctuation at the end of the antenna coil 12 is modulated. The detection/demodulation circuit 26 demodulates the change in the amplitude of the voltage fluctuation, and generates a high or low output signal in response to each bit included in the key code transmitted from the transponder 22.

The voltage signal output from the detection/demodulation circuit 26 is supplied to a micro computer 28 provided in the ECU 16. The microcomputer 28 includes a random access memory (RAM) 30 which is a non-volatile memory, and a read only memory (ROM) 32. The microcomputer 28 recognizes a portion of the signal output from the detection/demodulation circuit 26 as the key code transmitted by the transponder 22, and stores the key code in the RAM 30.

The microcomputer 28 is connected to an electrically erasable programmable ROM (EEPROM) 34, a power source circuit 26 and the EFI computer 18. A plurality of predetermined registered codes assigned to the vehicle are stored in the EEPROM 34 which is a non-volatile memory. The microcomputer 28 determines whether or not the key code stored in the RAM 30 matches one of the registered codes stored in the EEPROM 34. When the key code matches one of the registered codes, an instruction is issued from the microcomputer 28 to the EFI computer 18 to render the vehicle in an operable state. More specifically, the instruction includes information for turning on an ignition system and information for allowing a fuel injection operation. On the contrary, when the key code does not match any one of the registered codes, the instruction is not issued from the microcomputer 28 to the EFI computer 18. In this case, the ignition system is turned on, and fuel injection is not performed. Thus, the operation of the vehicle is prohibited.

The power source circuit 36 supplies a driving power to the microcomputer 28. The power source circuit 36 is connected to a power source via a key switch 38. The power source circuit 36 generates a voltage of 5 V when a source voltage (+B) is supplied thereto. The key switch 38 is turned on when the key 20 is inserted into the key cylinder 10. Thus, when the key 20 is not inserted into the key cylinder 10, the power source circuit 36 does not generate the voltage of 5 V. Thus, the microcomputer 28 does not operate. In this case, the communication circuit 14 is also maintained in a non-operable state. When the key 20 is inserted into the key cylinder 10, the source voltage is supplied to the microcomputer 28 via the power source circuit 36. Thus, the microcomputer 28 and the communication circuit 14 are turned to an operable state.

Figure 3:
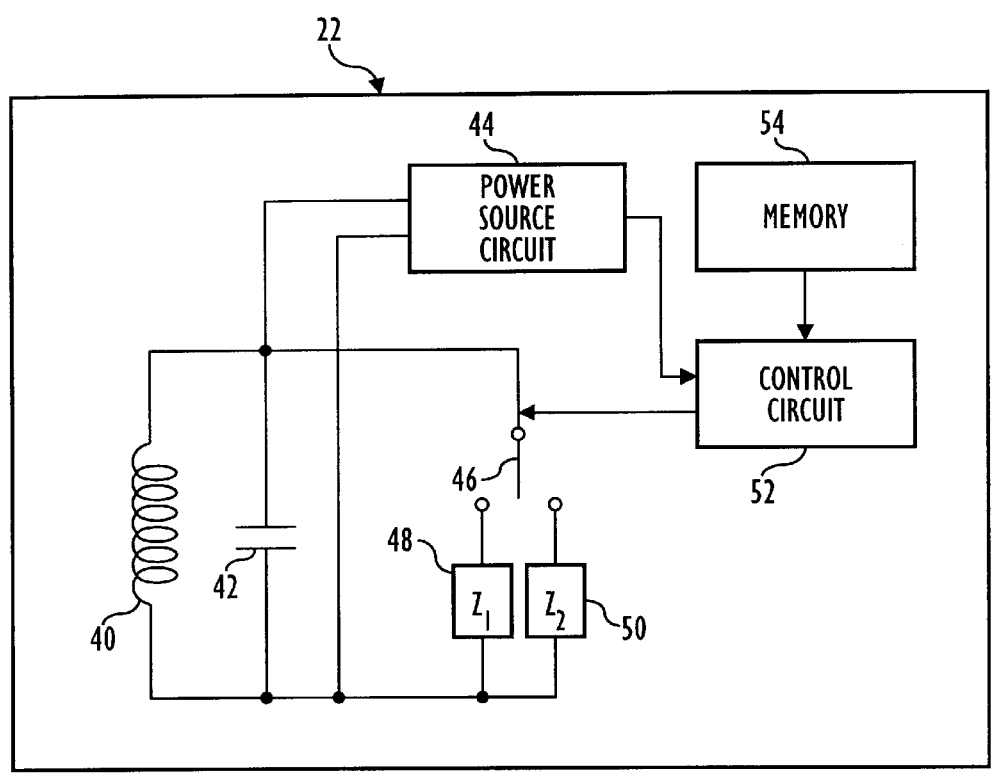
FIG. 3 is a block diagram of circuitry of a transponder shown in FIG. 1.

A description will now be given, with reference to FIG. 3, of a structure of the transponder 22. FIG. 3 is a block diagram of the circuitry of the transponder 22. The transponder includes a coil 40. When the voltage across the antenna coil 12 fluctuates at a predetermined period, an alternate magnetic field is generated around the antenna coil 12. The coil 40 is provided in the transponder 22 to detect the alternate magnetic field when the key 20 is inserted into the key cylinder 10.

An end of the coil 40 is connected to a terminal of a capacitor 42, a terminal of a power source circuit 44 and a switch circuit 46. An opposite end of the coil 40 is connected to an opposite terminal of the capacitor 42, an opposite terminal of the power source circuit 44 and load circuits 48 and 50. The coil 40 and the capacitor 42 together constitute an LC oscillation circuit. The specifications of the coil 40 and the capacitor 42 are determined to generate a resonance in the LC oscillation circuit when the alternate magnetic field is generated by the antenna coil 12. Additionally, a rectifying circuit is provided in the power source circuit 44 to rectify a resonance signal to generate a predetermined DC voltage when the resonance is generated in the LC oscillation circuit.

The DC voltage generated in the power source circuit 44 is supplied to a control circuit 52. The control circuit 52 is connected to a memory 54. A key code the same as one of the registered codes stored in the EEPROM 34 is stored in the memory 54. The control circuit 52 supplies a drive signal to the switch circuit 46 in accordance with the key code stored in the memory 54 when power is supplied by the power source circuit 44.

Load circuits 48 and 50 are provided with different loads Z1 and Z2, respectively. When a drive signal is supplied from the control circuit 52 to the switch circuit 46 to connect the load circuit 48, the load Z1 is connected to the LC oscillation circuit comprised of the coil 40 and the capacitor 42. This state is hereinafter referred to as a first state. On the other hand, when a drive signal is supplied from the control circuit 52 to the switch circuit 46 to connect the load circuit 50, the load Z2 is connected to the LC oscillation circuit comprised of the coil 40 and the capacitor 42. This state is hereinafter referred to as a second state.

A resonance condition of the LC oscillation circuit differs from the first state in which the load Z1 is connected to the LC oscillation circuit to the second state in which the load Z2 is connected to the LC oscillation circuit. In this embodiment, a value of the load Z1 is determined so that the resonance frequency of the LC oscillation circuit matches the frequency of the alternate magnetic field generated by the antenna coil 12 when the first state is achieved. Additionally, a value of the load Z2 is determined so that the resonance frequency of the LC oscillation circuit is shifted from the frequency of the alternate magnetic field generated by the antenna coil 12 when the second state is achieved. Accordingly, voltage signals having different amplitudes are generated across the coil 40 in response to the connection of the switch circuit 46.

As mentioned above, according to the transponder 22, the amplitude of the voltage generated across the coil 40 can be changed in accordance with the connection of the switch circuit 46 as to which load circuit 48 or 50 is connected via the switch circuit 46. The control circuit 52 controls the connection of the switch circuit 46 to either one of the load circuits 48 and 50 in accordance with a value of each bit of a signal to be transmitted being "1" or "0". When the control circuit 52 operates the switch circuit 46, a voltage having an amplitude corresponding to a value of a bit of the signal to be transmitted is generated across the coil 40.

The control circuit 52 sequentially supplies a series of drive signals, which correspond to a start signal, to the switch circuit 46 after supply of the power from the power source circuit 44 is started. Then, the control circuit 52 sequentially supplies to the switch circuit 46 a series of drive signals which correspond to the key code stored in the memory 54 and a series of drive signals which correspond to a stop signal. Thus, after the transponder 22 is activated, a) the variation in the amplitude of the voltage corresponding to the start signal, b) the variation in the amplitude of the voltage corresponding to the key code and c) the variation in the amplitude of the voltage corresponding to the stop signal appear across the coil 40 of the transponder 22 with respect to passage of time.

During the process of inserting the key 20 into the key cylinder 10, when the transponder 22 moves close to the antenna coil 12, a mutual inductance M between the antenna coil 12 and the coil 40 of the transponder 22 is increased. Thus, the inductance of the antenna coil 12 is influenced by a state of the coil 40. In such a condition, the amplitude of the voltage across the antenna coil 12 is influenced by the amplitude of the voltage across the coil 40. That is, a voltage having an amplitude corresponding to the amplitude of the voltage across the coil 40 is generated across the antenna coil 12. The amplitude of the voltage generated across the antenna coil 12 corresponds to the value of each bit of the signal to be transmitted.

Accordingly, when the voltages having the amplitudes corresponding to the start signal, the key code and the stop signal are generated sequentially across the coil 40 with respect to passage of time, the voltages having amplitudes corresponding to values of bits of the start signal, the key code and the stop signal are generated across the antenna coil 12. The detection/demodulation circuit 26 demodulates the variation in the amplitude of the voltages across the antenna 12 to a binary signal, and supplies the binary signal to the microcomputer 28.

The microcomputer 28 recognizes the part of the binary signal between the start signal and the stop signal as a signal corresponding to the key code transmitted from the transponder 22. The part of the binary signal corresponding to the key code comprises a predetermined number of bits. Thereafter, the key code is stored in the RAM 30, and a process is performed for maintaining or withdrawing the prohibition of operation of the vehicle.

Figure 4:
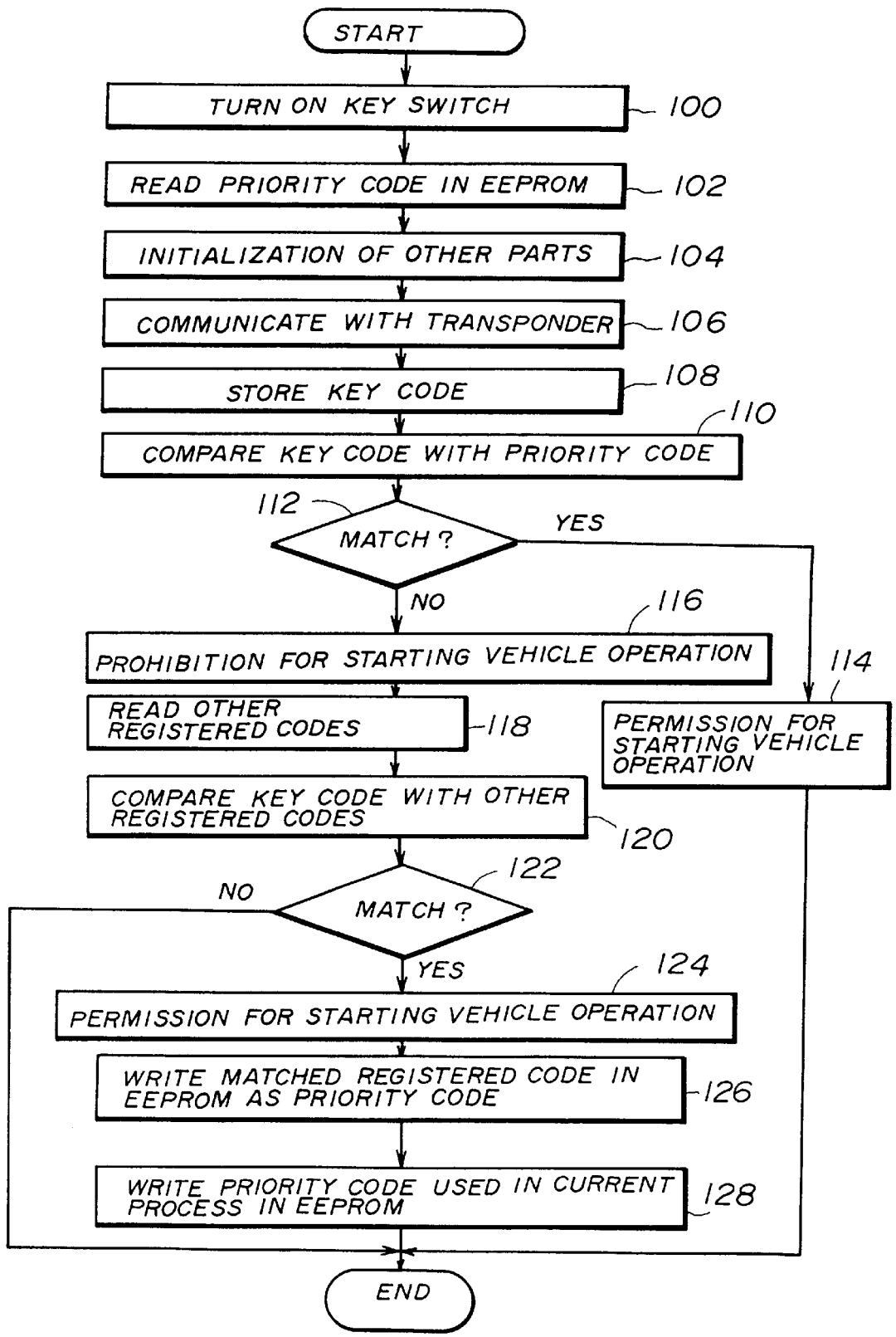
FIG. 4 is a flow chart of an operation performed by the code discriminating system according to the first embodiment of the present invention.

The above-mentioned anti-theft system has the code discriminating system which can determine whether the key code transmitted from the transponder 22 matches one of the registered codes stored in the EEPROM 34. A description will now be given, with reference to FIGS.4 to 8, of an operation of the code discriminating system according to the present embodiment. FIG. 4 is a flowchart of a routine performed by the ECU 16 so as to achieve the above-mentioned code discriminating function. FIGS.5 to 8 are illustrations of memory maps of the RAM 30 and the EEPROM 34.

Figure 5:
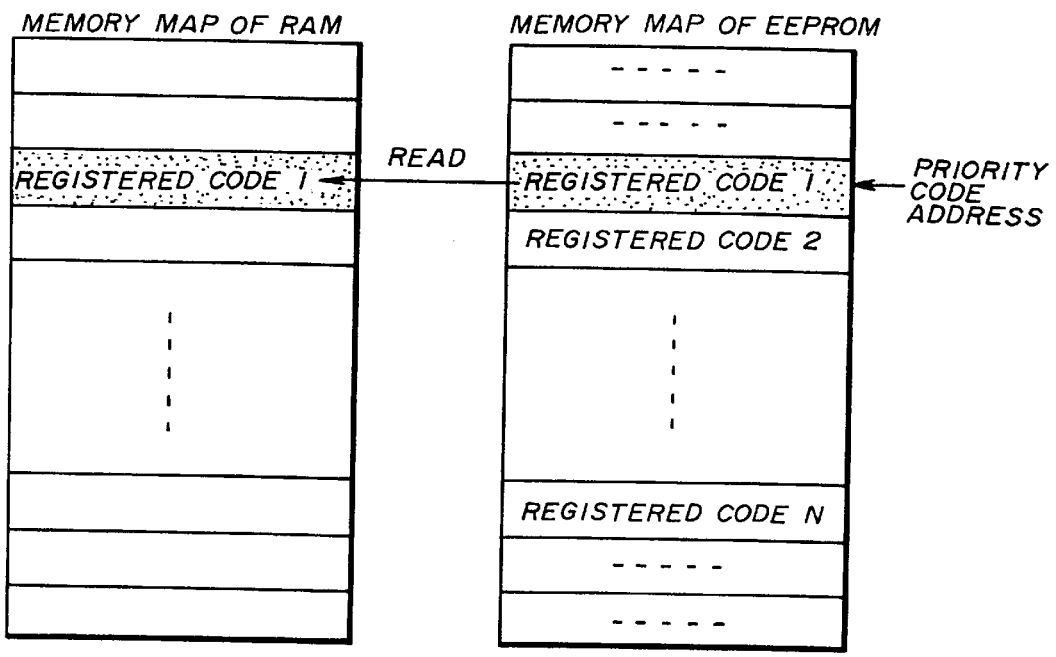
FIG. 5 is an illustration of memory maps of a RAM and an EEPROM shown in FIG. 2 for explaining the process of step 102 of the flowchart in FIG. 4.

In the initial state of the EEPROM 34, N registered codes 1 to N are stored in the EEPROM 34 as shown in FIG. 5. A priority code address is set in the EEPROM 34. In the case of FIG. 5, the registered code 1 is stored in the priority code address. The registered code 1 corresponds to the key code of one of the ignition keys which is predicted to have a maximum possibility of use. Hereinafter, the registered code stored in the priority code address is referred to as a priority code. Thus, in the initial state, the registered code 1 corresponds to the priority code.

The routine shown in FIG. 4 is started when the ignition key 20 is inserted into the key cylinder 10 and the key switch 38 is turned on in step 100. In step 102, the priority code is read from the EEPROM 34 and stored in a predetermined address of the RAM 30 (refer to FIG. 5). Thereafter, in step 104, initialization for other parts is performed, and then the routine proceeds to step 106.

In step 106, a communication is performed between the transponder 22 and the ECU 16 so that the key code is transmitted from the transponder 22 to the ECU 16 via the communication circuit 14. In step 108, a signal obtained by the communication is encoded to obtain the key code and the obtained key code is stored in the predetermined address of the RAM 30.

Figure 6:
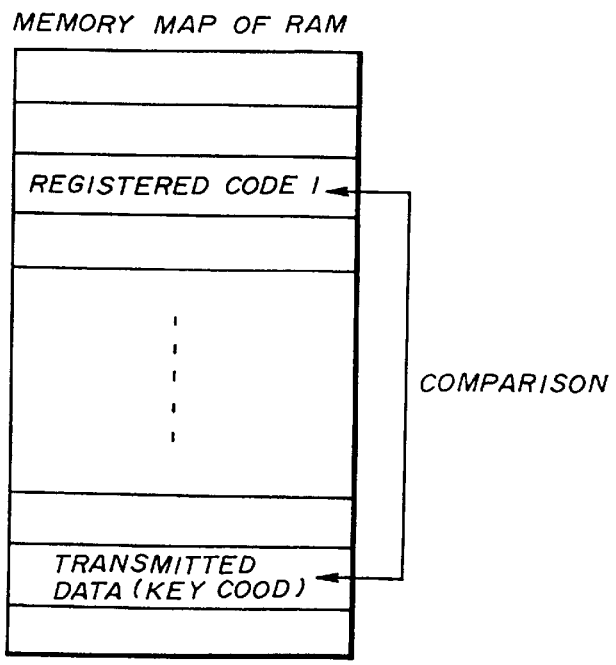
FIG. 6 is a memory map of the RAM for explaining the process of step 110 of the flowchart shown in FIG. 4.
Figure 7:
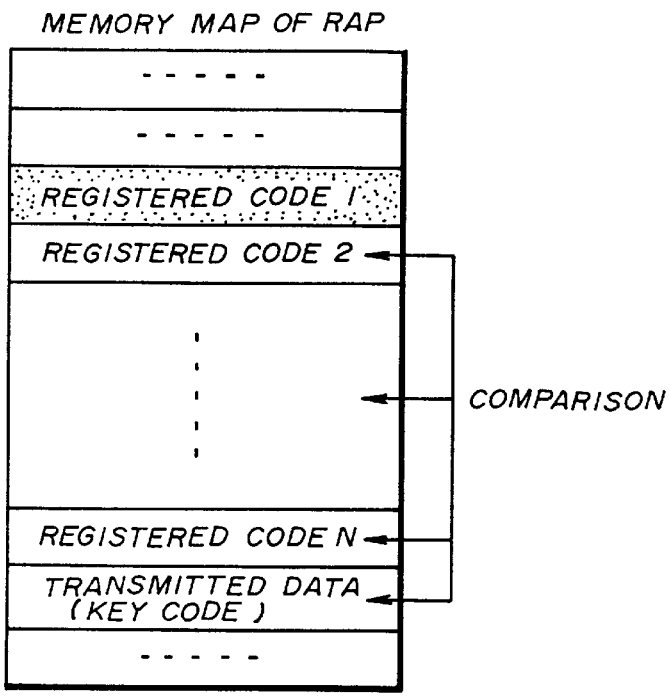
FIG. 7 is a memory map of the RAM for explaining the process of step 120 of the flowchart shown in FIG. 4.

In step 110, the key code stored in the RAM 30 is compared with the priority code also stored in the RAM 30 (refer to FIG. 6). It is then determined, in step 112, whether or not the key code matches the priority code in RAM 30. If it is determined that the key code matches the priority code, this indicates that the ignition key 20 used at this time is a correct key. In this case, the routine proceeds to step 114. In step 114, an instruction is sent to the EFI computer 18 for rendering the vehicle in an operable condition, and the routine is ended. on the other hand, if it is determined, in step 112, that the key code does not match the priority code, the routine proceeds to step 116. In step 116, an instruction is sent to the EFI computer 18 for rendering the vehicle inoperative. Thereafter, in step 118, all registered codes other than the priority code are read from the EEPROM 34 and stored in predetermined addresses of the RAM 30. Hereinafter, the registered codes other than the priority code are referred to as non-priority codes. Thereafter, in step 120, the key code is compared, in turn, with each of the non-priority codes.

It is then determined, in step 122, whether or not the key code matches one of the non-priority codes. If it is determined that the key code matches none of the non-priority codes, then the ignition key 20 used at this time cannot be a correct key. Thus, the routine is ended without permitting the vehicle to be operable.

Figure 8:
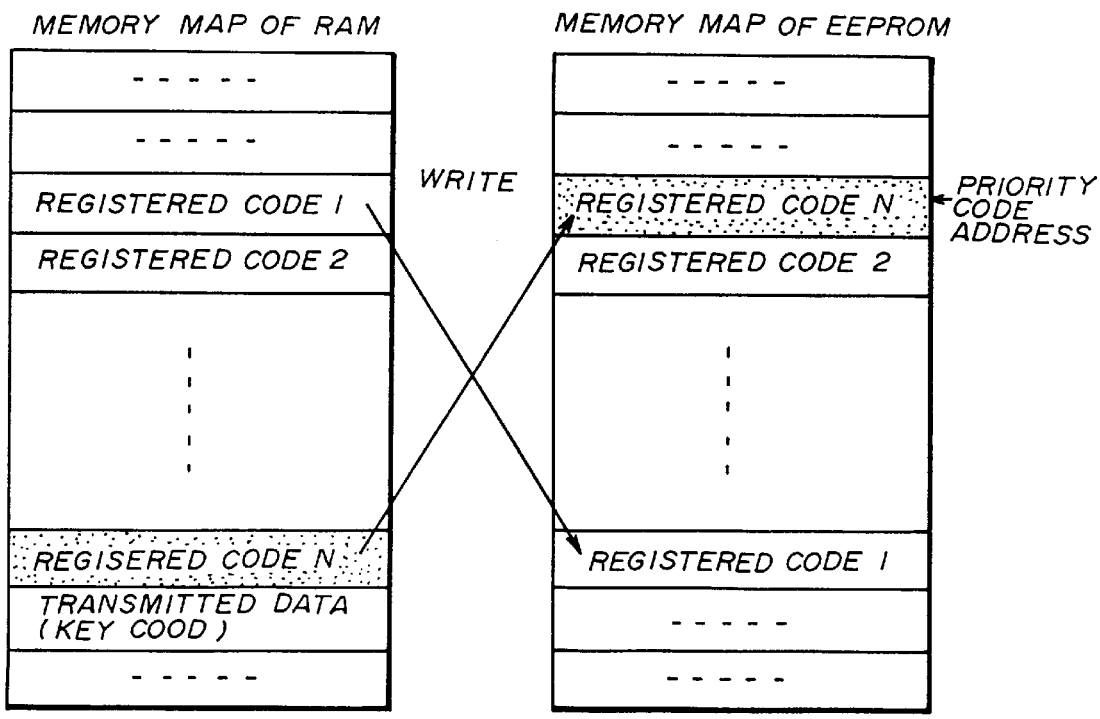
FIG. 8 is an illustration of memory maps of the RAM and the EEPROM for explaining the process of steps 126 and 128 of the flowchart in FIG. 4.

On the other hand, if it is determined, in step 122, that the key code matches one of the non-priority codes, the ignition key used at this time is determined to be a correct key. In this case, the routine proceeds to step 124. In step 124, the instruction for rendering the vehicle operable is sent to the EFI computer 18. Thereafter, in step 126, one of the non-priority code that is determined to match the key code in step 122 is written in the priority code address of the EEPROM 34. Thus, the non-priority code which matches the key code at this time is used as the priority code in the next process. Thereafter, in step 128, the priority code which was used in the current process is stored in the address of the EEPROM 34 in which the registered code written in the priority code address of the EEPROM 34 in step 126 was stored, and then the routine is ended. In the case of FIG. 8, the priority code used in the current process corresponds to the registered code 1, and the non-priority code which matches the key code in the current process corresponds to the registered code N.

As mentioned above, according to the present embodiment, only the priority code is read from the EEPROM 34 first so as to be compared with the key code. Then, other registered codes are read only when the key code does not match the priority code so as to determine whether there is a non-priority code which matches the key code. If there is a non-priority code which matches the key code, that non-priority code is considered to be the priority code for the next process.

If a plurality of ignition keys are provided to a single vehicle, the same key is mostly used. Accordingly, in the present embodiment, the probability of matching of the priority code and the key code in step 112 is high. This means that the process performed in step 116 to 128 is not frequently performed. Thus, an average time period spent on the determination as to whether there is a code matching the key code among the registered codes is reduced.

Figure 9:
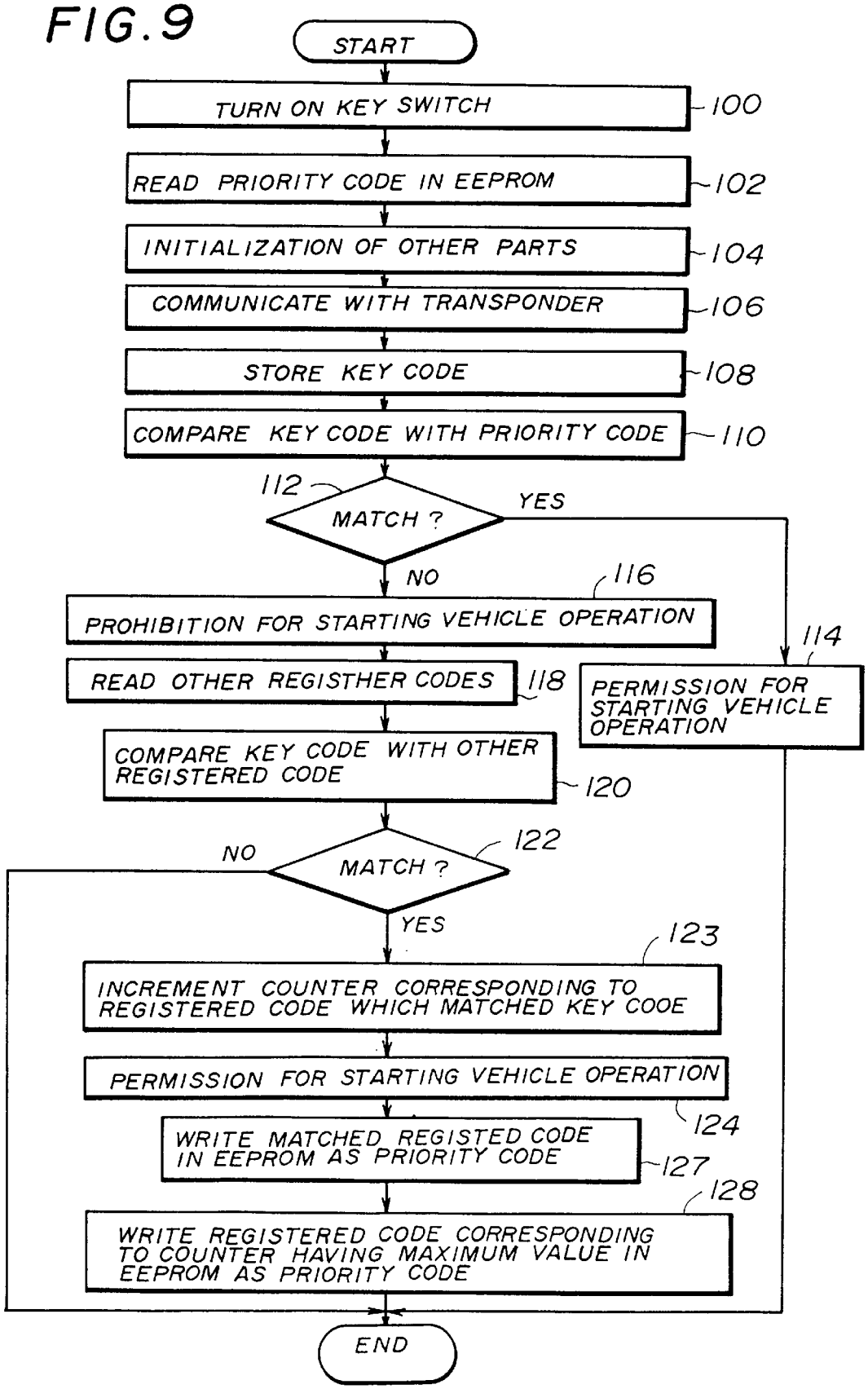
FIG. 9 is a flow chart of an operation performed by a code discriminating system according to a second embodiment of the present invention.

A description will now be given, with reference to FIG. 9, of a code discriminating system according to a second embodiment of the present invention. It should be noted that the code discriminating system according to the second embodiment of the present invention has the same structure as that of the first embodiment described above. FIG. 9 is a flowchart of a routine of an operation performed by the ECU 16 provided in the code discriminating system according to the second embodiment.

The routine shown in FIG. 9 is characterized in that the registered code corresponding to the key code provided to the most frequently used key is set as the priority code. In FIG. 9, steps that are the same as the steps shown in FIG. 4 are given the same reference numerals, and descriptions thereof will be omitted.

The routine shown in FIG. 9 is started, similar to the routine shown in FIG. 4, when the ignition key 20 is inserted into the key cylinder 10 and the key switch 36 is turned on. In this routine, counters 1 to N, respectively corresponding to the registered codes 1 to N, are provided in the EEPROM 34. The process of step 100 to step 122 is the same as that of the routine shown in FIG. 4. In the present routine shown in FIG. 9, if it is determined, in step 122, that the key code matches one of the registered codes (registered code i (i=1 to N)), the routine proceeds to step 123. In step 123, the counter i corresponding to the registered code i which was determined to match the key code in step 122 is incremented. Then, in step 124, similar to the routine of FIG. 4, the instruction for rendering the vehicle operable is sent to the EFI computer 18. Thereafter, the routine proceeds to step 127 which replaces step 126 of FIG. 4. In step 127, the registered code corresponding to the counter having the maximum value is written in the priority code address of the EEPROM 34. Then, in step 128, the registered code used in the current process is written in the EEPROM 34 if it is not the register code corresponding to the counter having the maximum value, and then the routine is ended.

As mentioned above, according to the routine shown in FIG. 9, the highest priority is given to the registered code which most frequently matches the key code. Thus, probability of matching of the key code and the priority code for the most frequently used key is increased when ignition keys with different key codes have an intermixed used. Accordingly, this embodiment also reduces an average time period for determining as to whether the key code matches one of the registered codes.

The process for determining matching of the key code and the registered codes is after the ignition key is inserted into the key cylinder. The engine of the vehicle cannot be started until the determination process is completed. Thus, in order to perform a smooth starting operation of the engine, the determination process should be completed during a short period of time after insertion of the ignition key to a turning of the ignition key for starting the engine. Since the code discriminating system according to the above-mentioned embodiments of the present invention reduces the time period spent on the determination process, a smooth starting operation without waiting time can be provided for a vehicle anti-theft system having the code discriminating system according to the present invention.

The present invention is not limited to the specifically disclosed embodiments, and variations and modifications may be made without departing from the scope of the invention.

What is claimed is:

1. A code discriminating system for determining whether a key code provided to a key matches one of a plurality of registered codes provided to said code discriminating system, said code discriminating system comprising:

communicating means for receiving the key code from said key;

comparing means for comparing the key code with each of said registered codes; and priority providing means for providing a priority to one of said registered codes so that the key code is first compared with said one of said registered codes.

2. The code discriminating system as claimed in claim 1, wherein said one of said registered codes which is provided with the priority is one of a code of said plurality of said registered codes determined to match the key code in a most recent comparison performed by said comparing means.

3. The code discriminating system as claimed in claim 1, wherein said one of said registered codes provided with the priority is a code of said plurality of said registered codes determined by a maximum number of matchings with the key code in previously performed comparisons.

4. The code discriminating system as claimed in claim 3, wherein a counter is provided to each of said registered codes so that a number of matchings with the key code is determined by a value of said counter.

5. The code discriminating system as claimed in claim 1, wherein said comparing means comprises a first memory for storing said plurality of said registered codes and a second memory for storing at least one of said registered codes which is read from said first memory, the comparison with the key code being performed on said registered codes stored in said second memory.

6. The code discriminating system as claimed in claim 5, wherein said first memory has a predetermined exclusive address for said one of said registered codes provided with the priority.

7. The code discriminating system as claimed in claim 6, wherein said one of said registered codes which is stored in said predetermined address of said first memory is read and stored in said second memory first.

8. The code discriminating system as claimed in claim 7, wherein the rest of said registered codes stored in said first memory other than said one of said registered codes stored in said first memory are read and stored in said second memory after it is determined that said one of said registered codes which was read from said predetermined address of said first memory fails to match the key code.

9. The code discriminating system as claimed in claim 5, wherein said one of said registered code which is provided with the priority is a code of said plurality of said registered codes which was determined to match the key code in a most recent comparison performed by said comparing means.

10. The code discriminating system as claimed in claim 5, wherein said one of said registered codes provided with the priority is a code of said plurality of said registered codes which has a maximum number of matchings with the key code in previously performed comparisons.

11. The code discriminating system as claimed in claim 10, wherein a counter is provided to each of said registered codes so that a number of matchings with the key code is determined by a value of said counter.

12. The code discriminating system as claimed in claim 5, wherein said first memory comprises a ROM and said second memory comprises a RAM.

13. The code discriminating system as claimed in claim 1, wherein said key includes a transponder transmitting the key code in response to a signal provided by said communicating means.

14. The code discriminating system as claimed in claim 1, wherein the code discriminating system is used as a security system.

15. The code discriminating system as claimed in claim 14, wherein the security system is a vehicle anti-theft system.

* * * * *